US012336951B1

(12) United States Patent
Schaffner

(10) Patent No.: US 12,336,951 B1
(45) Date of Patent: Jun. 24, 2025

(54) MODULAR HARNESS SYSTEM AND METHOD OF MANUFACTURE

(71) Applicant: Martha A Schaffner, San Diego, CA (US)

(72) Inventor: Martha A Schaffner, San Diego, CA (US)

( * ) Notice: Subject to any disclaimer, the term of this patent is extended or adjusted under 35 U.S.C. 154(b) by 0 days.

(21) Appl. No.: 18/906,568

(22) Filed: Oct. 4, 2024

(51) Int. Cl.
*A61H 19/00* (2006.01)

(52) U.S. Cl.
CPC ....... *A61H 19/50* (2013.01); *A61H 2201/163* (2013.01); *A61H 2201/1652* (2013.01); *A61H 2201/1685* (2013.01)

(58) Field of Classification Search
CPC .. A61H 19/00; A61H 19/50; A61H 2201/163; A61H 2201/1652; A61H 2201/1685; A47C 15/008; A61F 5/37; A61F 5/3761
See application file for complete search history.

(56) References Cited

U.S. PATENT DOCUMENTS

| | | | | |
|---|---|---|---|---|
| 2006/0142638 A1* | 6/2006 | Flores | A61F 5/41 600/38 | |
| 2020/0281807 A1* | 9/2020 | Madore | A61H 19/44 | |

FOREIGN PATENT DOCUMENTS

| | | | | |
|---|---|---|---|---|
| CA | 2665896 A1 * | 11/2010 | A61H 19/34 | |
| WO | WO-2013059787 A2 * | 4/2013 | A61H 19/00 | |
| WO | WO-2023230698 A1 * | 12/2023 | A61H 19/50 | |

* cited by examiner

*Primary Examiner* — Carrie R Dorna
(74) *Attorney, Agent, or Firm* — Esplin & Associates, PC

(57) ABSTRACT

This disclosure presents modular harness systems for rapid and easy exchange of sexual aid devices, and methods of manufacture thereof.

20 Claims, 4 Drawing Sheets

MODULAR HARNESS SYSTEM AND METHOD OF MANUFACTURE

FIELD OF THE DISCLOSURE

This disclosure relates to equipment and wearables related to sexual aid devices, and more specifically to a modular harness for removably engaging one or more sexual aid devices.

BACKGROUND

A sexual aid device may be used for sexual stimulation, such as penetrative stimulation. A "dildo" is a commonly used term referring to a sexual aid device. They are constructed from various materials, including silicone, rubber, plastic, wood, glass, and metal, and generally feature an elongated, phallic shape. The design often imitates a human penis or other shapes, both artificial and natural, to enhance sexual stimulation.

In certain designs, the base of a sexual aid device may include features such as an artificial scrotum, a flange, suction cup, and/or other features. An artificial scrotum may provide for a life-like appearance. A flange, suction cup, and/or other base features may allow a device to be affixed to (e.g., attached or simply rested on) stationary and/or moving objects (e.g., a table or floor surface, a mirror surface, and/or a machine).

SUMMARY

Sexual aid devices, such as dildos, are employed in various contexts. They may be used by individuals to share sexual pleasure, either as an alternative to or in addition to other forms of sexual activity. Sexual aid devices may be made in rigid, semi-rigid, solid, and/or flexible forms.

Using a hand to control a sexual aid device may interfere with various sexual activities as it occupies the user's hand(s). To address this issue, users may attach a sexual aid device to the user's body, allowing for hands-free use during sexual activity. Such devices and/or configurations may be referred to as "strap-on" devices. A strap-on device may attach to a user's body by using a harness to be worn by the user. The harness may be secured to the user's body via one or more straps and/or belts. One or more sexual aid devices may be attached permanently or removably to the harness. By way of non-limiting illustration, a sexual aid device may be fastened to a portion of the harness through one or more of screws, snap fits, and/or other permeant and/or removable fasteners.

Strap-on sexual aid devices (including accompanying harnesses) may come in numerous styles, differing in how the harness fits the user, how the sexual aid device attaches to the harness, and/or by varying features intended to stimulate the user or their partner. Many harnesses use common strap/belt configurations with two or more straps to secure the harness to the user.

Prior to the current disclosure, many issues existed with existing strap-on sexual aid devices. Specifically, these devices lacked the ability to quickly, effectively, and/or safely change the sexual aid device itself from a harness during sexual activities. Such issues are compounded when attempting to change to a sexual aid device of considerably different size, shape, length, girth, and/or weight than a previously attached device. Additionally, the presence of multiple and/or complex components can lead to the accumulation of unwanted dirt and/or bacteria between the parts, which is unhygienic.

As evidenced by the range of strap-on devices in the market, numerous methods have been considered to achieve a desired outcome. Previously, compromises between comfort and hygiene were necessary.

One or more aspects of the present disclosure overcomes one or more limitations in existing devices by implementing a modular harness system. The present disclosure proposes a system comprising a set of modular components, so that the system may be customizable and configurable. The present disclosure also contemplates significant advantage over the prior art, including ease of manufacture, adjustability, modifiability, comfort and fit for a broad range of users, rapid modification during use (e.g., exchange of different sexual aid devices to the harness), and/or quick disassembly for thorough cleaning.

In accordance with one or more implementations, a modular harness system of the present disclosure may comprise one or more of a set of modular components, one or more securement elements, a set of auxiliary coupling elements, and/or other components.

The set of modular components may be configured to facilitate removable engagement of one or more sexual aid devices. The individual modular components may include one or more of harness coupling element(s), sexual aid coupling element(s), and/or other elements. The harness coupling element(s) of individual modular components may be configured to facilitate coupling of the individual modular components with other individual modular components. The sexual aid coupling element(s) may be configured to facilitate removable engagement of one or more sexual aid devices. In some implementations, one or more modular components in a set may facilitate removable engagement of the one or more sexual aid devices, while one or more other modular components in the set may facilitate an as-used (or as-worn) mode of the system by securing components of the system together so that the system is configured to be worn, for example, as a belt.

In some implementations, a set of modular components may include a quantity of modular components that facilitates removable engagement of one sexual aid device. In some implementations, a set of modular components may include a quantity of modular components that facilitates removable engagement of two or more sexual aid devices. In some implementations, a set of modular components may include a quantity of modular components that facilitates removable engagement of three or more sexual aid devices. In some implementations, a set of modular components may include a quantity of modular components that facilitates removable engagement of three sexual aid devices.

By way of non-limiting illustration, the set of modular components may include one or more of a first modular component, a second modular component, a third modular component, a fourth modular component, a fifth modular component, and/or other modular components. The first modular component may include one or more of a first harness coupling element, a first sexual aid coupling element, and/or other elements. The second modular component may include one or more of a second harness coupling element, a second sexual aid coupling element, and/or other elements. The third modular component may include one or more of a third harness coupling element, a third sexual aid coupling element, and/or other elements. The fourth modular component may include a fourth harness coupling element and/or other elements. The fifth modular component may include a fifth harness coupling element and/or other elements. The fourth and fifth modular components may be disposed as ends of the system such that a first securement element may secure the fifth modular component to the fourth modular component in an as-used mode.

As used herein, any association (or relation, or reflection, or indication, or correspondence) involving components that interact with any part of the system and/or play a part in the operation of the system, may be a one-to-one association, a one-to-many association, a many-to-one association, and/or a many-to-many association or N-to-M association (note that N and M may be different numbers greater than 1). As used herein, the phrase "configured to" is intended to be interpreted broadly, as "being capable of or suitable for performing" some function or feature, without requiring any adaptations to provide said function or feature.

These and other features and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
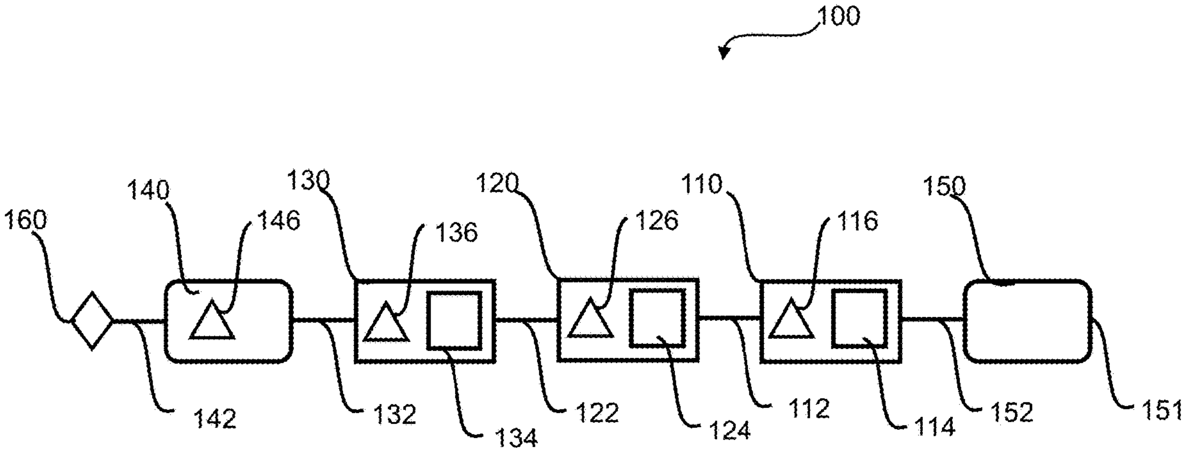
FIG. 1 illustrates a modular harness system, in accordance with one or more implementations.

FIG. 1 illustrates a view of a modular harness system 100, in accordance with one or more implementations. In some implementations, the modular harness system 100 may have different physical designs and/or dimensions, which may be configured to meet the needs and/or requirements of the end user or users. It is understood that this invention is not limited to the configuration, materials and modifications described and as such may, of course, vary. It is also understood that the terminology used herein is for the purpose of describing aspects only and is not intended to limit the scope of the present invention, which is limited only by the appended claims.

Unless otherwise specified, technical and scientific terms used herein carry the same meanings as those commonly understood by someone skilled in the relevant field. It should be noted that the term "sexual activity" encompasses and can be used interchangeably with terms such as "oral sex," "intercourse," "foreplay," "anal sex," and "masturbation." While similar or equivalent methods, systems, or materials to those described here can be employed in the practice or testing of the invention, example preferred methods, systems, and materials may be detailed for illustrative purposes.

It is noted that terms such as "posterior", "anterior", "forward", "rearward", "front", "rear", "upper", "lower", "distal", "proximal", "palmar", "dorsal", "left", and/or "right" may be relative terms when considering the system in an as-used position and/or based on a conventional use. One or more of these terms may refer to anatomical directions. The use of these terms with various components should therefore be easily understood by a person skilled in the art as related to orientation, direction, and/or disposition. Further, some directions may be specifically defined herein and shown in the figures.

In accordance with one or more implementations, in FIG. 1, the modular harness system 100 may comprise one or more of a set of modular components (e.g., one or more of 110, 120, 130, 140, and/or 150), one or more securement elements (e.g., 160), a set of auxiliary coupling elements (e.g., one or more of 116, 126, 136, and/or 146), and/or other components.

The set of modular components may be configured to facilitate removable engagement of one or more sexual aid devices (not shown in FIG. 1). The individual modular components may include one or more of harness coupling element(s), sexual aid coupling element(s), and/or other elements. The harness coupling element(s) of individual modular components may be configured to facilitate coupling of the individual modular components with other individual modular components. The sexual aid coupling element(s) may be configured to facilitate the removable engagement of the one or more sexual aid devices. In some implementations, one or more modular components in a set may facilitate removable engagement of the one or more sexual aid devices, while one or more other modular components in the set may facilitate an as-used (or as-worn) mode (not shown in FIG. 1) of the system 100 by securing components of the system 100 together to form a belt and/or harness.

In some implementations, the set of modular components may include a quantity of modular components that facilitates removable engagement of one sexual aid device. In some implementations, the set of modular components may include a quantity of modular components that facilitates removable engagement of two or more sexual aid devices. In some implementations, the set of modular components may include a quantity of modular components that facilitates removable engagement of three or more sexual aid devices. In some implementations, the set of modular components may include a quantity of modular components that facilitates removable engagement of three sexual aid devices.

By way of non-limiting illustration, the set of modular components may include one or more of a first modular component 110, a second modular component 120, a third modular component 130, a fourth modular component 140, a fifth modular component 150, and/or other modular components.

The first modular component 110 may include one or more of a first harness coupling element 112, a first sexual aid coupling element 114, a first auxiliary coupling element 116, and/or other elements. The second modular component 120 may include one or more of a second harness coupling element 122, a second sexual aid coupling element 124, a second auxiliary coupling element 126, and/or other elements. The third modular component 130 may include one or more of a third harness coupling element 132, a third sexual aid coupling element 134, a third auxiliary coupling element 136, and/or other elements. The fourth modular component 140 may include one or more of a fourth harness coupling element 142, a fourth auxiliary coupling element 146, and/or other elements. The fifth modular component 150 may include a fifth harness coupling element 152 and/or other elements.

The fourth modular component 140 and fifth modular component 150 may be disposed as ends of the system 100 such that a first securement element 160 may secure the fifth modular component 150 to the fourth modular component 140 at end 151 in the as-used mode (not shown in FIG. 1).

In some implementations, an individual modular component may include one or more of a component body, a first end, a second end opposite the first end, and/or other elements. In some implementations, individual modular components for removably engaging a sexual aid device may include an individual sexual aid coupling element at the first end, and an individual harness coupling element at the second end.

A component body of an individual modular component may comprise a strap segment. An individual sexual aid coupling element may include an individual rigid O-shaped ring and/or other coupling elements. Different sexual aid coupling elements may be sized differently to facilitate removable engagement with differently sized sexual aid devices. Different sizing of sexual aid coupling elements may be based on different diameters of respective O-shaped rings (not shown in FIG. 1).

By way of non-limiting illustration, the first sexual aid coupling element 114, the second sexual aid coupling element 124, and the third sexual aid coupling element 134 may be sized differently from one another to facilitate removable engagement with differently sized sexual aid devices. The different sizing of the first sexual aid coupling element 114, the second sexual aid coupling element 124, and the third sexual aid coupling element 134 may be based on different diameters of respective O-shaped rings.

In some implementations, individual harness coupling elements may include one or more fasteners. Fasteners may include one or more of snap fit fasteners, clips, clamps, and/or other fasteners. By way of non-limiting illustration, an end of a component body (comprising a strap) may be looped back on itself and secured via one or more snap fit fasteners. The loop formed at an end of a component body (and secured back on itself) may be used to attach to another modular component.

Individual securement elements may comprise one or more fasteners. A fastener of a securement element may include, for example, a buckle, a set of perforation (e.g., buckle holes), and/or other elements. In some implementations, one end of the system 100 may include a buckle, and an opposite end may include a set of buckle holes. By way of non-limiting illustration, the first securement element 160 may comprise a buckle, while an end 151 of fifth modular component 150 opposite the fifth harness coupling element 152 may include a set of buckle holes (not shown in FIG. 1).

An individual auxiliary coupling element in the set of auxiliary coupling elements may be attached to, or formed integrally as part of, an individual modular component. An individual auxiliary coupling element may be configured to facilitate removably coupling one or more auxiliary components that may be used with system 100. By way of non-limiting illustration, auxiliary components may include one or more of shoulder straps, groin straps, corset, boot or legging connectors, auxiliary hardware, pouches, electronic devices, batteries, sensors, wearables, peripherals, and/or other components. In some implementations, a pouch may hold a set of differently sized sexual aid coupling elements, and be attached to a modular component via an auxiliary coupling element, to keep the differently sized sexual aid coupling elements close at hand.

In some implementations, an individual auxiliary coupling element may include one or more of a ring, a clamp, a clip, and/or other devices. The individual auxiliary coupling element may be attached to a component body of a modular component. The individual auxiliary coupling element may be permanently or removably attached to a component body of a modular component. In some implementations, an auxiliary coupling element may be attached to a component body via material (e.g., section of strap material) using one or more fasteners. The auxiliary coupling element may be attached to a component body between the distal ends of the component body. By way of non-limiting illustration, material (e.g., strap material) may loop/wrap around a component body, which is then secured with a fastener.

By way of non-limiting illustration, an individual auxiliary coupling element may include a rigid D-shaped ring and/or other devices attached to a component body of a modular component through a piece of material that is looped/wrapped around the component body and ring to secure the ring to the component body. The material may be sewn to the component body and/or attached by one or more fasteners (e.g., snap fit fasteners).

Figure 2:
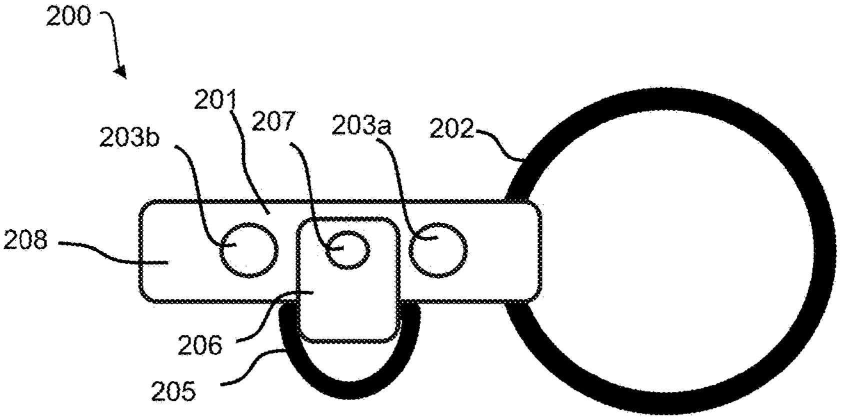
FIG. 2 illustrates a modular component for removably engaging a sexual aid device, in accordance with one or more implementations.

FIG. 2 illustrates an implementation of an individual modular component 200 for a modular harness system for rapid and easy adjustability of mounting sexual aid devices (e.g., system 100 in FIG. 1). The modular component 200 may comprise a component body 201 and/or other elements. The component body 201 may comprise, for example, a belt section. The component body 201 may comprise a flexible material which may be attached to a sexual aid coupling element 202 (e.g., an O-shaped ring) using a fastener **203*a* with an end of component body 201 looped back on itself and secured with the fastener 203*a*. The fastener 203*a* may include one or more of a rivet, snap, button, and/or other fastener. The component body 201 may be attached to another modular component (not shown in FIG. 2), a harness coupling element 208. The harness coupling element 208 may comprise one or more of a fastener 203*b*, an end (e.g., a section of strap) of component body 201 (opposite the end that attaches to sexual aid coupling element 202), and/or other components. To attach to another modular component, the end of the component body 201 may be looped back on itself and secured with the fastener 203*b*. The fastener 203*b*** may include one or more of a rivet, snap, button, and/or other fastener.

In some implementations, the component body 201 may have one or more auxiliary coupling elements, such as auxiliary coupling element 205 (e.g., a D-shaped ring). The auxiliary coupling element 205 may be attached to the component body 201 via an additional material 206 (e.g., additional strap material) using a fastener 207. The auxiliary coupling element 205 may be attached to the component body 201 between the ends of the component body 201. By way of non-limiting illustration, the additional material 206 may loop/wrap around the component body 201, which is then secured with fastener 207.

The sexual aid coupling element 202 may be used to mount one or more sexual aid devices. By way of non-limiting illustration, a sexual aid may be inserted through element 202 so that a base of the aid contacts the coupling element 202. In some implementations, element 202 may be metal material with a surface finish that is readily wiped down, cleaned, disinfected, and/or sanitized. By way of non-limiting illustration, element 202 may be a metal O-shaped ring.

In some implementations, sexual aid coupling element 202 may be removed by releasing fastener 203*a*, allowing for thorough cleaning.

In some implementation, sexual aid coupling element 202 may be rapidly exchanged with a new sexual aid coupling element (not shown in FIG. 2) of a different diameter, material, and/or thickness to accommodate a quick-change of sexual aid devices.

In some implementations, the component body 201 may be leather, or other flexible material or textile to contour and fit to the user's body safely and comfortably. The component body 201 may be contoured to comfortably fit any type of user. A comfortable fit is one where the user does not experience pain or excessive irritation when the full assembly is used as directed. The ability for a user to use the modular system allows sex partners to use sexual aid devices interchangeably.

In some implementations, component body 201 may be comprised of, but not limited to leather, finished leather, braided leather, tooled leather, suede, leather backed ribbon, webbing, woven, nonwoven, textile, canvas, rope, vinyl, polymer or plastic, rope, other natural or bio-based materials, metallic mesh, metallic links, metallic woven, metallic Milanese, or any combination thereof.

In some implementations, a thickness of the material used for component body 201 may vary in gauge and/or thickness. In some implementations, material may have a thickness or gauge of about 0.5 inches, about 0.475 inches, about 0.45 inches, about 0.425 inches, about 0.40 inches, about 0.375 inches, about 0.35 inches, about 0.325 inches, about 0.30 inches, about 0.275 inches, about 0.25 inches, about 0.225 inches, about 0.20 inches, about 0.175 inches, about 0.15 inches, about 0.125 inches, about 0.10 inches, about 0.075 inches, about 0.05 inches, about 0.025 inches including all ranges and values in between. In some implementations, the thickness is about 0.025 to about 0.5 inches, e.g., about 0.025 inches, about 0.05 inches, about 0.075 inches, about 0.10 inches, about 0.125 inches, about 0.15 inches, about 0.175 inches, about 0.20 inches, about 0.225 inches, about 0.25 inches, about 0.275 inches, about 0.30 inches, about 0.325 inches, about 0.35 inches, 0.375 inches, about 0.40 inches, about 0.425 inches, about 0.45 inches, about 0.475 inches, about 0.5 inches, including all ranges and values in between. In some implementations, the thickness or gauge may be about 0.22 inches.

In some implementations, a width of the material used for component body 201 may vary in gauge and/or thickness. In some implementations, material may have a width of about 2.3 inches, about 2.2 inches, about 2.1 inches, about 2.0 inches, about 1.9 inches, about 1.8 inches, about 1.7 inches, about 1.6 inches, about 1.5 inches, about 1.4 inches, about 1.3 inches, about 1.2 inches, about 1.1 inches, about 1.0 inches, about 0.9 inches, about 0.8 inches, about 0.7 inches, about 0.6 inches, about 0.5 inches, about 0.4 inches, about 0.3 inches, about 0.2 inches, including all ranges and values in between. In some implementations, the width is about 0.2 to about 2.3 inches, e.g., about 0.2 inches, about 0.3 inches, about 0.4 inches, about 0.5 inches, about 0.6 inches, about 0.7 inches, about 0.8 inches, about 0.9 inches, about 1.0 inches, about 1.1 inches, about 1.2 inches, about 1.3 inches, about 1.4 inches, about 1.5 inches, about 1.6 inches, about 1.7 inches, about 1.8 inches, about 1.9 inches, about 2.0 inches, about 2.1 inches, about 2.2 inches, 2.3 inches, including all ranges and values therebetween. In some implementations, the width may be about 1.45 inches.

In some implementations, a length of the material used for component body 201 may vary in length between ends, or mounting points between sexual aid coupling elements when assembled. In some implementations, the material may be wrapped, or looped to fasten to rings, or other modules. In some implementations, a length of the strap material in between and connection to other modular components may have a mounting connecting segment length (e.g. sexual aid coupling element to sexual aid coupling element) of about 6.0 inches, about 5.75 inches, about 5.5 inches, about 5.25 inches, about 5 inches, about 4.75 inches, about 4.5 inches, about 4.25 inches, about 4 inches, about 3.75 inches, about 3.5 inches, about 3.25 inches, about 3 inches, about 2.75 inches, about 2.5 inches, about 2.25 inches, about 2 inches, including all ranges and values in between. In some implementations, the width is about 2 to about 6 inches, e.g., about 2 inches, about 2.25 inches, about 2.5 inches, about 2.75 inches, about 3 inches, about 3.25 inches, about 3.5 inches, about 3.75 inches, about 4 inches, about 4.25 inches, about 4.5 inches, about 4.75 inches, about 5 inches, about 5.25 inches, about 5.5 inches, about 5.75 inches, about 6.0 inches, including all ranges and values therebetween. In some implementations, a length is about 4.0 inches.

In some implementations, a length of the material used for component body 201 may vary in length between ends, or mounting points between rings. In some implementations, longer sections of strap material may be incorporated. In some implementations, the length of the strap material used for the modular segment in between and as connection to rings or other straps may have a mounting connecting segment length (e.g. ring-to-ring) of about 12 inches, about 11 inches, about 10 inches, about 9 inches, about 8 inches, about 7 inches, about 5 inches, about 4 inches, about 3 inches, about 2 inches including all ranges and values in between. In some implementations, the width is about 2 to about 12 inches, e.g., about 2 inches, about 3 inches, about 4 inches, about 5 inches, about 6 inches, about 7 inches, about 8 inches, about 9 inches, about 10 inches, about 11 inches, about 12 inches, including all ranges and values therebetween. In some implementations, the length may be about 4.0 inches.

In some implementations, the length of the material used for component body 201 may vary in length between ends, or mounting points between rings. In some implementations, relatively longer sections of strap material may be incorporated. In some implementations, the length of the strap material used for modular component 200 in between and connection to rings or other straps may have a mounting connecting segment length (e.g., ring-to-ring) of about 30 inches, about 25 inches, about 20 inches, about 15 inches, about 10 inches, about 5 inches, including all ranges and values in between. In some implementations, the width is about 5 to about 30 inches, e.g., about 5 inches, about 10 inches, about 15 inches, about 20 inches, about 25 inches, about 30 inches, including all ranges and values therebetween. In some implementations, the length may be about 4.0 inches.

Figure 3:
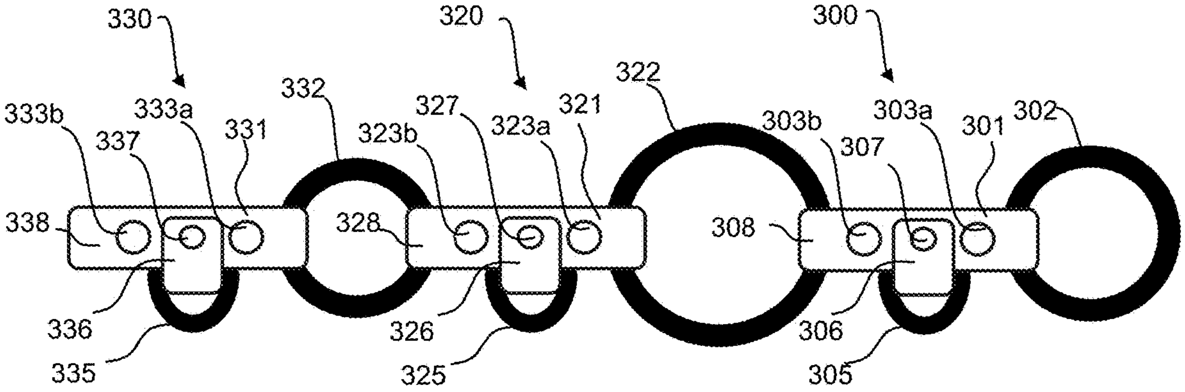
FIG. 3 illustrates a set of modular components, in accordance with one or more implementations.

FIG. 3 illustrates an implementation of a set of modular components for a modular harness system for rapid and easy adjustability of mounting sexual aid devices (e.g., system

100 in FIG. 1). FIG. 3 may represent an implementation with three modular components configured to facilitate removable engagement of one or more sexual aid devices, where each modular component may be differently sized than the others to accommodate a differently sized sexual aid device. In use, the system may be worn, for example, as a belt. A user may position a modular component so that a corresponding sexual aid coupling element of the component may be substantially centered on their body (or in another desired position for use). When a user is desirous of changing to a sexual aid of a different size, instead of changing out a sexual aid coupling element from a component, the user may rotate the system to position a differently sized sexual aid coupling element of a different component to a desired position, and insert a new sexual aid device for securement therein. A modular system utilizing the set of modular components as shown and/or described may allow a user to utilize differently sized sexual aid coupling elements in a single wearable, and simply readjust a position of the system on their body, to orient the desired the sexual aid coupling element of the proper size to an as-used position.

By way of non-limiting illustration, the set of modular components may include one or more of a first modular component 300, a second modular component 320, a third modular component 330, and/or other components. Individual modular components of FIG. 3 may be used in combination with one or more other individual modular components shown and described herein.

The first modular component 300 may comprise a component body 301 and/or other elements. The component body 301 may comprise, for example, a belt section. The component body 301 may comprise a flexible material which may be attached to a sexual aid coupling element 302 (e.g., an O-shaped ring) using a fastener 303*a* with an end looped back on itself. The fastener 303*a* may include one or more of a rivet, snap, button, and/or other fastener. The material may be seamed, sewn, or finished to securely attach the components to the component body 301.

In some implementations, the component body 301 may have one or more auxiliary coupling elements, such as auxiliary coupling element 305 (e.g., a D-shaped ring). The auxiliary coupling element 305 may be attached to the component body 301 via an additional material 306 (e.g., additional strap material) using one or more fasteners, such as a fastener 307. By way of non-limiting illustration, the additional material 306 may loop around the component body 301 and through element 305, to secure the element 305 to component body 301. The material 306 may be secured with fastener 307.

The sexual aid coupling element 302 may be used to mount one or more sexual aid devices. By way of non-limiting illustration, a sexual aid may be inserted through element 302 so that a base of the aid contacts the coupling element 302. In some implementations, element 302 may be metal material with a surface finish that is readily wiped down, cleaned, disinfected, and/or sanitized. By way of non-limiting illustration, element 302 may be a metal O-shaped ring.

In some implementations, sexual aid coupling element 302 may be removed by releasing fastener 303*a* and extending the end of the component body 301 from its looped/secured position around the sexual aid coupling element 302. The first modular component 300 may include a harness coupling element 308. The harness coupling element 308 may comprise one or more of a fastener 303*b*, an end (e.g., a section of strap) of component body 301 (opposite the end that attaches to sexual aid coupling element 302), and/or other components. To attach to another modular component, the end of the component body 301 may be looped back on itself and secured with the fastener 303*b*. In some implementations, the end of first modular component 300 may be opened by releasing fastener 303*b*. The first modular component 300 may then be attached to second modular component 320 (e.g., via sexual aid coupling element 322) by looping the end around sexual aid coupling element 322 and securing the end back to component body 301 via fastener 303*b*.

The second modular component 320 may comprise a component body 321 and/or other elements. The component body 321 may comprise, for example, a belt section. The component body 321 may comprise a flexible material which may be attached to a sexual aid coupling element 322 (e.g., an O-shaped ring) using a fastener 323*a* with an end looped back on itself. The fastener 323*a* may include one or more of a rivet, snap, button, and/or other fastener. The material may be seamed, sewn, or finished to securely attach the components to the component body 321.

In some implementations, the component body 321 may have one or more auxiliary coupling elements, such as auxiliary coupling element 325 (e.g., a D-shaped ring). The auxiliary coupling element 325 may be attached to the component body 321 via an additional material 326 using one or more fasteners, such as a fastener 327. By way of non-limiting illustration, the additional material 326 may loop/wrap around the component body 321 and through element 325, which is then secured with fastener 327.

The sexual aid coupling element 322 may be used to mount one or more sexual aid devices. By way of non-limiting illustration, a sexual aid may be inserted through element 322 so that a base of the aid contacts the coupling element 322. In some implementations, element 322 may be metal material with a surface finish that is readily wiped down, cleaned, disinfected, and/or sanitized. By way of non-limiting illustration, element 322 may be a metal O-shaped ring.

In some implementations, sexual aid coupling element 322 may be removed by releasing fastener 323*a* and extending the end of the component body 301 from its looped/wrapped position around the sexual aid coupling element 322. The second modular component 320 may include a harness coupling element 328. The harness coupling element 328 may comprise one or more of a fastener 323*b*, an end (e.g., a section of strap) of component body 321 (opposite the end that attaches to sexual aid coupling element 322), and/or other components. To attach to another modular component, the end of the component body 321 may be looped back on itself and secured with the fastener 323*b*. In some implementations, the end of second modular component 320 may be opened by releasing fastener 323*b*. The second modular component 320 may then be attached to third modular component 330 (e.g., via sexual aid coupling element 332) by looping the end around sexual aid coupling element 332 and securing the end back to component body 321 via fastener 323*b*.

The third modular component 330 may comprise a component body 331 and/or other elements. The component body 331 may comprise, for example, a belt section. The component body 331 may comprise a flexible material which may be attached to a sexual aid coupling element 332 (e.g., an O-shaped ring) using a fastener 333*a* with an end looped back on itself. The fastener 333*a* may include one or more of a rivet, snap, button, and/or other fastener. The material may be seamed, sewn, or finished to securely attach the components to the component body 331.

In some implementations, the component body 331 may have one or more auxiliary coupling elements, such as auxiliary coupling element 335 (e.g., a D-shaped ring). The auxiliary coupling element 335 may be attached to the component body 331 via an additional material 336 using one or more fasteners, such as a fastener 337. By way of non-limiting illustration, the additional material 336 may loop/wrap around the component body 331 and through element 335, which is then secured with fastener 337.

The sexual aid coupling element 332 may be used to mount one or more sexual aid devices. By way of non-limiting illustration, a sexual aid may be inserted through element 332 so that a base of the aid contacts the coupling element 332. In some implementations, element 332 may be metal material with a surface finish that is readily wiped down, cleaned, disinfected, and/or sanitized. By way of non-limiting illustration, element 332 may be a metal O-shaped ring. Each of elements 302, 322, and 332 may be differently sized O-shaped rings.

In some implementations, sexual aid coupling element 332 may be removed by releasing fastener 333*a* and extending the end of the component body 301 from its looped/wrapped position around the sexual aid coupling element 322. The third modular component 330 may include a harness coupling element 338. The harness coupling element 338 may comprise one or more of a fastener 333*b*, an end (e.g., a section of strap) of component body 331 (opposite the end that attaches to sexual aid coupling element 332), and/or other components. To attach to another modular component, the end of the component body 331 may be looped back on itself and secured with the fastener 333*b*. In some implementations, the end of first modular component 300 may be opened by releasing fastener 333*b*. The third modular component 330 may then be attached to another modular component (not shown in FIG. 3) by looping the end and securing the end back to component body 331 via fastener 333*b*.

Figure 4:
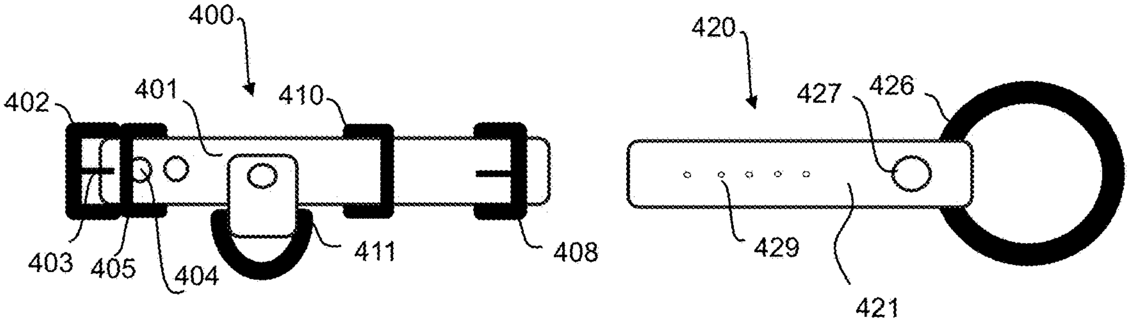
FIG. 4 illustrates a set of modular components, in accordance with one or more implementations.

FIG. 4 illustrates an implementation of a set of modular components for a modular harness system for rapid and easy adjustability of mounting sexual aid devices (e.g., system 100 in FIG. 1). FIG. 4 may represent an implementation of two modular components, with one modular component configured to facilitate removable engagement of one or more sexual aid devices, and another modular component used to secure the system in an as-used mode (e.g., worn around a user, for example, as a belt). Individual modular components of FIG. 4 may be used in combination with one or more other individual modular components shown and described herein.

By way of non-limiting illustration, the set of modular components may include one or more of a first modular component 400, a second modular component 420, and/or other components.

The first modular component 400 of FIG. 4 may comprise a component body 401 and/or other elements. The component body 401 may comprise, for example, a belt section. One end of first modular component 400 may include one or more of a buckle or frame 402, a buckle prong 403, a fastener 404, a strap keeper 405 (aka retaining hoop loop, retainer buckle, webbing holder, bag clasp, bag buckle, square loop, etc.), and/or other components. The buckle 402 may comprise a terminating end of a harness system when not in an as-used mode. One or more of the buckle 402, buckle prong 403, a fastener 404, strap keeper 405 and/or other components at the end of first modular component 400 in FIG. 4 may form a securement element.

An opposite end of first modular component 400 may include a second buckle or frame 408 (with prong). An additional strap keeper 410 may be incorporated to keep a strap end of another component (see, e.g., component body 421) attached via buckle 408 in place once adjusted to the user's preferred length. The first modular component 400 may be used to secure a harness system in an as-used mode (e.g., worn around a user, for example, as a belt). One or more of the elements 408, 410 disposed at this end may form yet another securement element. In some implementations, first modular component 400 may itself be considered a securement element (e.g., separate from other modular components having sexual aid coupling elements).

In some implementations, buckles 402 and/or 408 may vary in style, material, and/or connecting method. In some implementations, a buckle may be a frame style, or plate style using a hook and throw. In some implementations, a buckle may be a box frame style using a box and post. In some implementations, a buckle may be an O-ring or D-ring style, a snap style, a male-female style, a micro-adjust style using ratchet method and teeth and track on the mating strap end. In some implementations, a buckle may be a tactical quick release. In some implementations, a buckle material may be metal, plastic, natural materials, a combination of thereof, or use a non-buckle connecting style such as a knot, loop, or cinch fastening method. In some implementations, the component body 401 may have one or more auxiliary coupling elements, such as auxiliary coupling element 411 (e.g., a D-shaped ring).

The second modular component 420 may comprise a component body 421 and/or other elements. The component body 421 may comprise, for example, a belt section. The component body 421 may comprise a flexible material which may be attached to a sexual aid coupling element 426 (e.g., an O-shaped ring) using a fastener 427 with an end looped back on itself. The fastener 427 may include one or more of a rivet, snap, button, and/or other fastener. An end section of component body 421 opposite sexual aid coupling element 426 may include a harness coupling element, in the form of a series of perforations 429 (e.g., belt holes). The second modular component 420 may attach to the first modular component 400 by inserting the end of the component body 421 having the perforations 429 into buckle 408. A user may choose a desired length.

Figure 5:
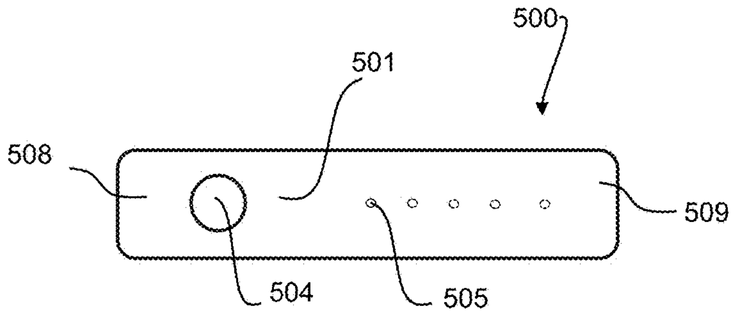
FIG. 5 illustrates a modular component, in accordance with one or more implementations.

FIG. 5 illustrates an implementation of a modular component 400 for a modular harness system for rapid and easy adjustability of mounting sexual aid devices (e.g., system 100 in FIG. 1). FIG. 5 may represent an implementation of a modular component used to secure the system in an as-used mode (e.g., worn around a user, for example, as a belt). The modular component 500 of FIG. 5 may be used in combination with one or more other individual modular components shown and described herein.

The modular component 500 of FIG. 5 may comprise a component body 501 and/or other elements. The component body 501 may comprise, for example, a belt section. The component body 401 may comprise a flexible material which may be attached to a harness coupling element 508 and/or other elements. The harness coupling element 508 may comprise one or more of a fastener 504, an end (e.g., a section of strap) of component body 501 (opposite the end that attaches to sexual aid coupling element 302), and/or other components. To attach to another modular component, the end of the component body 501 may be looped back on itself and secured with the fastener 504. In some implementations, the end of modular component 500 may be opened by releasing fastener 504. The modular component 500 may then be attached to another modular component (via, for example, a sexual aid coupling element, such as an O-shaped ring) by looping the end around the other modular component and securing the end back to component body 501 via fastener 504. An end 509 of component body 501 may be opposite harness coupling element 508. The end 509 may comprise an opposite terminating end of a harness system when not in an as-used mode (with buckle 402 of the component 400 in FIG. 4 being the other terminating end). An end 509 of component body 421 opposite sexual aid may include a harness coupling element, in the form of a series of perforations 505 (e.g., belt holes). The modular component 501 may attach to modular component 400 of FIG. 4 by inserting the end 509 of the component body 501 having the perforations 429 into buckle 402.

Figure 6:
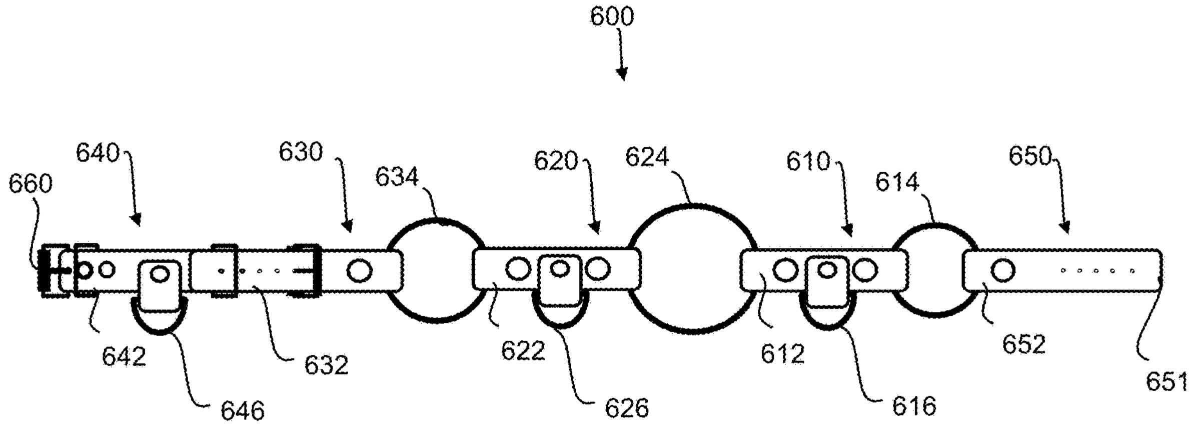
FIG. 6 illustrates a modular harness system, in accordance with one or more implementations.

FIG. 6 illustrates a modular harness system 600, in accordance with one or more implementations. In accordance with one or more implementations, in FIG. 6, the modular harness system 600 may comprise one or more of a set of modular components (e.g., 610, 620, 630, 640, and/or 650), one or more securement elements (e.g., 160), a set of auxiliary coupling elements (e.g., 616, 626, and/or 646), and/or other components.

The set of modular components may be configured to facilitate removable engagement of one or more sexual aid devices (not shown in FIG. 6). The individual modular components may include one or more of harness coupling element(s), sexual aid coupling element(s), and/or other elements. The harness coupling element(s) of individual modular components may be configured to facilitate coupling of the individual modular components with other individual modular components. The sexual aid coupling element(s) may be configured to facilitate the removable engagement of the one or more sexual aid devices. In some implementations, one or more modular components in a set may facilitate removable engagement of the one or more sexual aid devices, while one or more other modular components in the set may facilitate an as-used (or as-worn) mode (not shown in FIG. 6) of the system 600 by securing components of the system 600 together to form a belt and/or harness.

In some implementations, the set of modular components may include a quantity of modular components that facilitates removable engagement of one sexual aid device. In some implementations, the set of modular components may include a quantity of modular components that facilitates removable engagement of two or more sexual aid devices. In some implementations, the set of modular components may include a quantity of modular components that facilitates removable engagement of three or more sexual aid devices. In some implementations, the set of modular components may include a quantity of modular components that facilitates removable engagement of three sexual aid devices.

By way of non-limiting illustration, the set of modular components may include one or more of a first modular component 610, a second modular component 620, a third modular component 630, a fourth modular component 640, a fifth modular component 650, and/or other modular components.

The first modular component 610 may include one or more of a first harness coupling element 612, a first sexual aid coupling element 614, a first auxiliary coupling element 616, and/or other elements. In some implementations, the first modular component 610 may be the same as, or similar to, an individual modular component 200 of FIG. 2, with a particular size O-shaped ring.

The second modular component 620 may include one or more of a second harness coupling element 622, a second sexual aid coupling element 624, a second auxiliary coupling element 626 and/or other elements. In some implementations, the third modular component 620 may be the same as, or similar to, an individual modular component 200 of FIG. 2, with a particular size O-shaped ring which is larger or smaller than that of the first modular component 610.

The third modular component 630 may include one or more of a third harness coupling element 632, a third sexual aid coupling element 634, and/or other elements. In some implementations, third modular component 630 may be the same as, or similar to, modular component 420 of FIG. 4, with a particular size O-shaped ring which is larger or smaller than that of the first modular component 610 and/or second modular component 620.

The fourth modular component 640 may include a fourth harness coupling element 642, a third auxiliary coupling element 646, and/or other elements. In some implementations, fourth modular component 640 may be the same as, or similar to, modular component 400 of FIG. 4.

The fifth modular component 650 may include a fifth harness coupling element 652, an end 651 opposite the fifth harness coupling element, and/or other elements. In some implementations, fifth modular component 650 may be the same as, or similar to, modular component 500 of FIG. 5.

The fourth modular component 640 and fifth modular component 650 may be disposed as ends of the system 600 such that a first securement element 660 may secure the fifth modular component 650 to the fourth modular component 640 in the as-used mode (not shown in FIG. 6).

In some implementations, an individual modular component may include one or more of a component body, a first end, a second end opposite the first end, and/or other elements. In some implementations, individual modular components for removably engaging a sexual aid device may include an individual sexual aid coupling element at the first end, and an individual harness coupling element at the second end.

A component body of an individual modular component may comprise a strap segment. An individual sexual aid coupling element may include an individual rigid O-shaped ring and/or other coupling elements. Different sexual aid coupling elements may be sized differently to facilitate removable engagement with differently sized sexual aid devices. Different sizing of sexual aid coupling elements may be based on different diameters of respective O-shaped rings.

By way of non-limiting illustration, the first sexual aid coupling element 614, the second sexual aid coupling element 624, and the third sexual aid coupling element 634 may be sized differently from one another to facilitate removable engagement with differently sized sexual aid devices. The different sizing of the first sexual aid coupling element 614, the second sexual aid coupling element 624, and the third sexual aid coupling element 634 may be based on different diameters of respective O-shaped rings.

In some implementations, individual harness coupling elements may include one or more fasteners. Fasteners may include snap fit fasteners. By way of non-limiting illustration, an end of a component body (comprising a strap) may be looped back on itself and secured via one or more snap fit fasteners. The loop formed at an end of a component body (and secured back on itself) may be used to attach to another modular component. Sexual aid coupling devices may be similarly fastened.

Individual securement elements may comprise one or more fasteners. A fastener of a securement element may include, for example, a buckle, a set of perforation (e.g., buckle holes), and/or other elements. In some implementations, one end of the system 600 may include a buckle, and an opposite end may include a set of buckle holes. By way of non-limiting illustration, the first securement element 660 may comprise a buckle, while an end 651 of fifth modular component 650 opposite the fifth harness coupling element 652 may include a set of buckle holes.

An individual auxiliary coupling element in the set of auxiliary coupling elements may be attached to, or formed integrally as part of, an individual modular component. An individual auxiliary coupling element may be configured to facilitate removably coupling one or more auxiliary components that may be used with system 100. By way of non-limiting illustration, auxiliary components may include one or more of shoulder straps, groin straps, auxiliary hardware, pouches, electronic devices, batteries, sensors, wearables, peripherals, and/or other components. In some implementations, a pouch may hold a set of differently sized sexual aid coupling elements, and be attached to a modular component via an auxiliary coupling element, to keep the differently sized sexual aid coupling elements close at hand.

In some implementations, an individual auxiliary coupling element may include one or more of a ring, a clamp, a clip, and/or other devices. The individual auxiliary coupling element may be attached to a component body of a modular component. The individual auxiliary coupling element may be permanently or removably attached to a component body of a modular component. In some implementations, an auxiliary coupling element may be attached a component body via material (e.g., section of strap material) and using one or more fasteners. The auxiliary coupling element may be attached to a component body between the distal ends of the component body. By way of non-limiting illustration, material (e.g., strap material) may loop/wrap around a component body, which is then secured with a fastener.

By way of non-limiting illustration, an individual auxiliary coupling element may include a rigid D-shaped ring and/or other devices attached to a component body of a modular component through a piece of material that is looped/wrapped around the component body and ring to secure the ring to the component body. The material may be sewn to component body and/or attached by one or more fasteners (e.g., snap fit fasteners).

Figure 7:
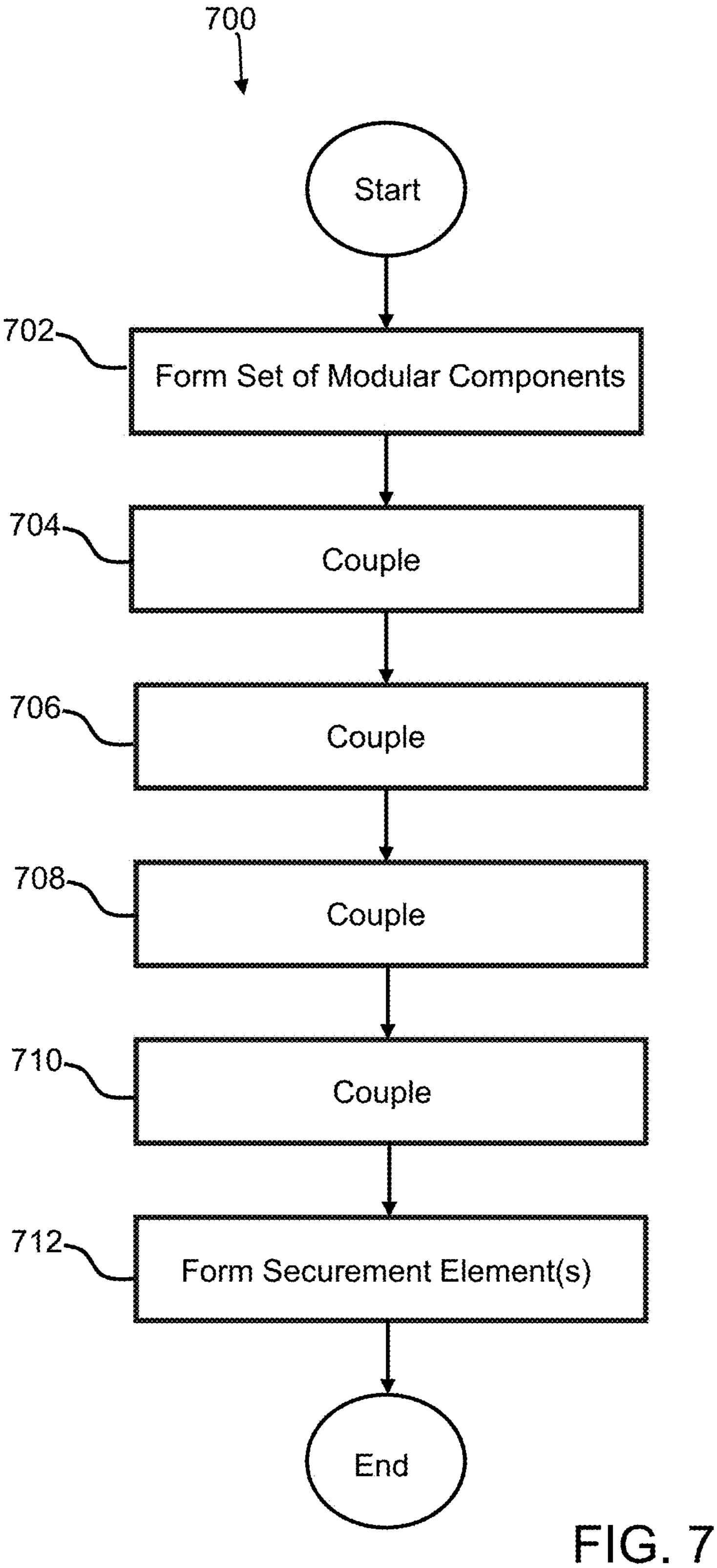
FIG. 7 illustrates a method of manufacture of a modular harness system, in accordance with one or more implementations.

FIG. 7 illustrates a method 700 of manufacture of a modular harness system, in accordance with one or more implementations. The operations of method 700 presented below are intended to be illustrative. In some implementations, method 700 may be accomplished with one or more additional operations not described, and/or without one or more of the operations discussed. Additionally, the order in which the operations of method 700 are illustrated in FIG. 7 and described below is not intended to be limiting.

In some implementations, operations of method 700 may be implemented using manual and/or automated manufacturing techniques. A manual manufacturing technique may include one or more forming techniques used by skilled artisans. A forming technique may include one or more of cutting, shaving, sewing, stamping, riveting, stretching, folding, and/or other techniques. Other techniques known to skilled artisans are also within the scope of the present disclosure. An automated manufacturing technique may include machines and one or more processing devices. The one or more processing devices and/or machines may include one or more devices executing some or all of the operations of method 700 in response to instructions stored electronically on an electronic storage medium. The one or more processing devices and/or machines may include one or more devices configured through hardware, firmware, and/or software to be specifically designed for execution of one or more of the operations of method 700.

An operation 702 may include forming a set of modular components configured to facilitate removable engagement of one or more sexual aid devices. The individual modular components may be formed to include one or more of harness coupling element(s), sexual aid coupling element(s), and/or other elements. The harness coupling element(s) of individual modular components may be configured to facilitate coupling of the individual modular components with other individual modular components. The sexual aid coupling element(s) may be configured to facilitate removable engagement of one or more sexual aid devices. Individual modular components in the set may include any individual modular component described herein. By way of non-limiting illustration, the set of modular components may include one or more of one or more of a first modular component, a second modular component, a third modular component, a fourth modular component, a fifth modular component, and/or other modular components. The first modular component may include one or more of a first harness coupling element, a first sexual aid coupling element, and/or other elements. The second modular component may include one or more of a second harness coupling element, a second sexual aid coupling element, and/or other elements. The third modular component may include one or more of a third harness coupling element, a third sexual aid coupling element, and/or other elements. The fourth modular component may include a fourth harness coupling element and/or other elements. The fifth modular component may include a fifth harness coupling element and/or other elements.

An operation 704 may include coupling the first modular component to the second modular component via the first harness coupling element.

An operation 706 may include coupling the second modular component to the third modular component via the second harness coupling element.

An operation 708 may include coupling the third modular component to the fourth modular component via the third harness coupling element.

An operation 710 may include coupling the fifth modular component to the first modular component via the fifth harness coupling element.

An operation 712 may include forming one or more securement elements configured to facilitate securement of the set of modular components in an as-used mode of the modular harness system on a portion of a user's body.

As used herein, in particular implementations, the terms "about" or "approximately" when preceding a numerical value indicates the value plus or minus a range of 10% and/or other ranges. Where a range of values is provided, it is understood that intervening values, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the implementations, should be understood to mean "either or both" of the elements so conjoined, i.e., elements that are conjunctively present in some cases and disjunctively present in other cases. As used herein, "contacting" refers to the act of touching, making contact, and/or of immediate proximity.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A modular harness system for sexual aid devices, the modular harness system comprising:

a set of modular components configured to facilitate removable engagement of one or more sexual aid devices, wherein individual modular components in the set of modular components include one or more harness coupling elements configured to facilitate coupling with other individual modular components in the set of modular components, and/or one or more sexual aid coupling elements configured to facilitate the removable engagement of the one or more sexual aid devices, such that the set of modular components includes:

a first modular component, the first modular component including a first harness coupling element and a first sexual aid coupling element;

a second modular component, the second modular component including a second harness coupling element, and a second sexual aid coupling element;

a third modular component, the third modular component including a third harness coupling element, and a third sexual aid coupling element;

a fourth modular component, the fourth modular component including a fourth harness coupling element;

a fifth modular component, the fifth modular component including a fifth harness coupling element;

wherein the first modular component couples to the second modular component via the first harness coupling element;

wherein the second modular component couples to the third modular component via the second harness coupling element;

wherein the third modular component couples to the fourth modular component via the third harness coupling element; and wherein the fifth modular component couples to the first modular component via the fifth harness coupling element; and one or more securement elements configured to facilitate securement of the set of modular components in an as-used mode of the modular harness system on a portion of a user's body, such that the one or more securement elements include a first securement element that secures the fifth modular component to the fourth modular component in the as-used mode.

2. The modular harness system of claim 1, wherein an individual modular component in the set of modular components includes:

a component body;

a first end;

a second end opposite the first end; and wherein an individual sexual aid coupling element of the one or more sexual aid coupling elements is at the first end, and an individual harness coupling element of the one or more harness coupling elements is at the second end.

3. The modular harness system of claim 2, wherein the component body is a strap.

4. The modular harness system of claim 3, wherein individual sexual aid coupling elements of the one or more sexual aid coupling elements include individual rigid O-shaped rings.

5. The modular harness system of claim 4, wherein the first sexual aid coupling element, the second sexual aid coupling element, and the third sexual aid coupling element are sized differently from one another to facilitate removable engagement with differently sized sexual aid devices of the one or more sexual aid devices.

6. The modular harness system of claim 5, wherein different sizing of the first sexual aid coupling element, the second sexual aid coupling element, and the third sexual aid coupling element is based on different diameters of respective ones of the individual rigid O-shaped rings.

7. The modular harness system of claim 1, wherein individual harness coupling elements of the one or more harness coupling elements include snap fit fasteners.

8. The modular harness system of claim 1, wherein the first securement element is a buckle.

9. The modular harness system of claim 8, wherein an end of the fifth modular component opposite the fifth harness coupling element includes a set of buckle holes.

10. The modular harness system of claim 1, further comprising:

a set of auxiliary coupling elements, wherein an individual auxiliary coupling element in the set of auxiliary coupling elements is attached to an individual modular component in the set of modular components.

11. The modular harness system of claim 10, wherein the individual auxiliary coupling element is a rigid D-shaped ring.

12. The modular harness system of claim 1, further comprising:

a set of auxiliary coupling elements, wherein an individual auxiliary coupling element in the set of auxiliary coupling elements is attached to an individual modular component in the set of modular components, wherein the individual auxiliary coupling element is a rigid D-shaped ring.

13. A method of manufacture of a modular harness system for sexual aid devices, the method comprising:

forming a set of modular components configured to facilitate removable engagement of one or more sexual aid devices, individual modular components in the set of modular components including one or more harness coupling elements configured to facilitate coupling with other individual modular components in the set of modular components, and/or one or more sexual aid coupling elements configured to facilitate the removable engagement of the one or more sexual aid devices, the set of modular components including:

a first modular component, the first modular component including a first harness coupling element and a first sexual aid coupling element;

a second modular component, the second modular component including a second harness coupling element, and a second sexual aid coupling element;

a third modular component, the third modular component including a third harness coupling element, and a third sexual aid coupling element;

a fourth modular component, the fourth modular component including a fourth harness coupling element; and a fifth modular component, the fifth modular component including a fifth harness coupling element;

coupling the first modular component to the second modular component via the first harness coupling element;

coupling the second modular component to the third modular component via the second harness coupling element;

coupling the third modular component to the fourth modular component via the third harness coupling element;

coupling the fifth modular component to the first modular component via the fifth harness coupling element; and forming one or more securement elements configured to facilitate securement of the set of modular components in an as-used mode of the modular harness system on a portion of a user's body, the one or more securement elements including a first securement element.

14. The method of claim 13, further comprising securing, via the first securement element, the fifth modular component to the fourth modular component in the as-used mode.

15. The method of claim 13, wherein an individual modular component in the set of modular components includes:

a component body comprising a strap;

a first end;

a second end opposite the first end; and wherein an individual sexual aid coupling element of the one or more sexual aid coupling elements is formed at the first end, and an individual harness coupling element of the one or more harness coupling elements is formed at the second end.

16. The method of claim 15, wherein individual sexual aid coupling elements of the one or more sexual aid coupling elements include individual rigid O-shaped rings.

17. The method of claim 16, wherein the first sexual aid coupling element, the second sexual aid coupling element, and the third sexual aid coupling element are sized differently from one another to facilitate removable engagement with differently sized sexual aid devices of the one or more sexual aid devices.

18. The method of claim 17, further comprising:

selecting a set of rigid O-shaped-rings comprising multiple ones of the individual rigid O-shaped rings, the individual rigid O-shaped rings in the set of rigid O-shaped-rings having different diameters from one another, such that different sizing of the first sexual aid coupling element, the second sexual aid coupling element, and the third sexual aid coupling element is based on the different diameters of respective ones of the individual rigid O-shaped rings.

19. The method of claim 13, wherein individual harness coupling elements of the one or more harness coupling elements include snap fit fasteners.

20. The method of claim 13, wherein the first securement element is a buckle; and an end of the fourth modular component opposite the fourth harness coupling element includes a set of buckle holes.

* * * * *